US012032359B2

(12) United States Patent
Singh et al.

(10) Patent No.: US 12,032,359 B2
(45) Date of Patent: Jul. 9, 2024

(54) PREDICTION OF PREHEAT REFRACTORY TEMPERATURE PROFILE OF A LADLE FURNACE

(71) Applicant: Tata Consultancy Services Limited, Mumbai (IN)

(72) Inventors: Umesh Singh, Pune (IN); Purushottham Gautham Basavarsu, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 374 days.

(21) Appl. No.: 17/652,125

(22) Filed: Feb. 23, 2022

(65) Prior Publication Data

US 2022/0317660 A1 Oct. 6, 2022

(30) Foreign Application Priority Data

Feb. 25, 2021 (IN) .............................. 202121007925

(51) Int. Cl.
*G06F 30/20* (2020.01)
*G05B 19/4155* (2006.01)
(Continued)

(52) U.S. Cl.
CPC ........... *G05B 19/4155* (2013.01); *G06N 3/08* (2013.01); *G05B 2219/45132* (2013.01)

(58) Field of Classification Search
CPC ...... G05B 19/4155; G05B 2219/45132; G06N 3/08; G06N 3/048; G06N 3/084;
(Continued)

(56) References Cited

U.S. PATENT DOCUMENTS 8,002,871 B2 * 8/2011 Lu ....................... G05B 23/0294
75/375
10,859,316 B1 * 12/2020 Richter ..................... F27B 3/28
(Continued)

OTHER PUBLICATIONS

Fredman, T.P. et al., "Model for Temperature Profile Estimation in the Refractory of a Metallurgical Ladle", Process Metallurgy and Materials Processing Science, Date: Jun. 1998, vol. 29B, Issue: 3, Publisher: Pro Quest, https://www.proquest.com/openview/a3f260a275de048a012f1cc35839e421f/1?pg-origsite=gsholar&cbl=49318.
(Continued)

*Primary Examiner* — Ramesh B Patel
(74) *Attorney, Agent, or Firm* — FINNEGAN, HENDERSON, FARABOW, GARRETT & DUNNER, LLP

(57) ABSTRACT

The present disclosure addresses the technical problem of prediction of a preheat refractory temperature profile of a ladle furnace. Operational temperature of the ladle furnace, stability of sensors and placement make sensors not feasible. Computational Fluid Dynamics (CFD) simulations require large computation time and cannot be used for runtime applications in plants. The method and system of the present disclosure uses CFD modeling to carry out parametric study to generate data which is further processed to train an Artificial Neural Network (ANN) model that serves as a prediction model for predicting the preheat refractory temperature profile for at least a portion of the side refractory and at least a portion of the bottom refractory layer separately for which a new set of input data is obtained. The trained prediction model of the present disclosure provides a quick runtime prediction in plants.

15 Claims, 4 Drawing Sheets

(51) Int. Cl.
  *G06N 3/08* (2023.01)
  *G06N 20/00* (2019.01)
(58) Field of Classification Search
  CPC ..... F27D 2019/0003; F27D 2019/0006; F27D 19/00; F27D 21/00; B22D 1/00; B22D 11/10; B22D 41/00; B22D 41/12; B22D 46/00; F27B 14/20
  See application file for complete search history.

(56) References Cited

U.S. PATENT DOCUMENTS

| | | | | |
|---|---|---|---|---|
| 11,475,180 | B2* | 10/2022 | Singh | G06N 3/084 |
| 11,500,368 | B2* | 11/2022 | Gaduparthi | G05B 23/0235 |
| 11,592,359 | B2* | 2/2023 | Tambe | G06Q 10/0635 |
| 11,755,976 | B2* | 9/2023 | Zhao | G06Q 50/04 |
| | | | | 705/7.37 |
| 2015/0143806 | A1* | 5/2015 | Friesth | F01K 13/02 |
| | | | | 220/592.2 |
| 2019/0278879 | A1* | 9/2019 | Singh | G06N 3/084 |
| 2021/0096093 | A1* | 4/2021 | Richter | F27D 21/02 |
| 2022/0179400 | A1* | 6/2022 | Deodhar | H04L 67/12 |
| 2022/0196396 | A1* | 6/2022 | Bayram | G01B 15/02 |
| 2022/0219411 | A1* | 7/2022 | Humfeld | G06N 3/08 |
| 2024/0085114 | A1* | 3/2024 | Bayram | F27D 21/0014 |

OTHER PUBLICATIONS

Glaser Bjo rn, et al., "Thermal Modelling of the Ladle Preheating Process", Steel Research International, Date: Dec. 2011, vol. 82(12), pp. 1425-1434, Publisher: Research Gate, https://www.researchgate.net/publication/262102682_Thermal_Modelling_of_the_Ladle_Preheating_Process/link/5d13cb53458515c11cfb546d/download.

Tripathi, Anurag et al., "Numerical Simulation of Heat Transfer Phenomenon in Steel Making Ladle", ISIJ International, Date: Dec. 2012, vol. 52, Issue: 9, pp. 1591-1600, Publisher: J-Stage, https://www.jstage.jst.go.jp/article/isijinternatinal/52/9/52_1591/_pdf/-char/en.

* cited by examiner

PREDICTION OF PREHEAT REFRACTORY TEMPERATURE PROFILE OF A LADLE FURNACE

PRIORITY CLAIM

This U.S. patent application claims priority under 35 U.S.C. § 119 to: Indian Patent Application No. 202121007925, filed on 25 Feb. 2021. The entire contents of the aforementioned application are incorporated herein by reference.

TECHNICAL FIELD

The disclosure herein generally relates to the field of preheating refractory-lined ladles, and, more particularly, to systems and methods for prediction of preheat refractory temperature profile of a ladle furnace.

BACKGROUND

The temperature above solidification point or superheat is a key variable on which casting speed of a metal such as steel is managed. If a temperature is more than required superheat is present, then the casting speed is lowered for better casting properties and therefore, production of the steel is reduced. On the other hand, if the superheat is less, then it may be possible that steel solidifies before going to the caster. Hence maintaining an optimum level of superheat at the caster is very important.

Maintaining the superheat at a range requires keeping a tight range of the bulk metal temperature variation at a ladle furnace outlet. Maintaining the tight range of ladle furnace outlet temperature requires prior prediction of different temperature losses from the refractory walls, loss from addition of alloy elements such as Ferro manganese, Ferro chrome, Lime, Ferro silicon, etc., and temperature gain from arcing. Out of all types of losses estimated, refractory temperature loss estimation is the most challenging in an industrial setup. This is because refractory temperature loss includes loss to the surrounding from the refractory walls and heat absorbed by the refractory itself that need to be considered. The heat absorbed by the refractory changes based on its prior temperature history or profile. Thus, knowing the initial refractory temperature profile becomes important for an overall estimation of the refractory temperature loss. It is very difficult to measure the initial temperature profile of the refractory using temperature sensors, as the operational temperature is very high, around 1600° C., and stability of the sensors and placement at different refractory points is very difficult.

SUMMARY

Embodiments of the present disclosure present technological improvements as solutions to one or more of the above-mentioned technical problems recognized by the inventors in conventional systems.

In an aspect, there is provided a processor implemented method comprising the steps of: obtaining, via one or more hardware processors, a plurality of training parameters comprising a set of geometrical parameters of a ladle furnace for processing a metal and a set of process parameters for associated ladle operations, wherein the ladle furnace is characterized by at least a side refractory and a bottom refractory; identifying, via the one or more hardware processors, a set of key training parameters using an influence index computed based on the plurality of training parameters; generating, via the one or more hardware processors, sample data corresponding to the identified set of key training parameters by dividing the identified set of key training parameters into a plurality of sets, wherein each of the plurality of sets represents the set of geometrical parameters and the set of process parameters; generating, via the one or more hardware processors, simulated data comprising a preheat refractory temperature, an outer layer temperature and a preheat refractory temperature profile, for at least a portion of the side refractory and at least a portion of the bottom refractory, using a Computational Fluid Dynamics (CFD) model which receives the sample data as input; transforming, via the one or more hardware processors, the preheat refractory temperature profile into a reduced form using a regression equation; and training, via the one or more hardware processors, an Artificial Neural Network (ANN) model using the preheat refractory temperature, the outer layer temperature, the reduced form of the preheat refractory temperature profile and the sample data to obtain a trained ANN model.

In another aspect, there is provided a system comprising: one or more data storage devices operatively coupled to one or more hardware processors and configured to store instructions configured for execution via the one or more hardware processors to: obtain, a plurality of training parameters comprising a set of geometrical parameters of a ladle furnace for processing a metal and a set of process parameters for associated ladle operations, wherein the ladle furnace is characterized by at least a side refractory and a bottom refractory; identify, a set of key training parameters using an influence index computed based on the plurality of training parameters; generate, sample data corresponding to the identified set of key training parameters by dividing the identified set of key training parameters into a plurality of sets, wherein each of the plurality of sets represents the set of geometrical parameters and the set of process parameters; generate, simulated data comprising a preheat refractory temperature, an outer layer temperature and a preheat refractory temperature profile before the ladle processing operation, for at least a portion of the side refractory and at least a portion of the bottom refractory, using a Computational Fluid Dynamics (CFD) model which receives the sample data as input; transform, the preheat refractory temperature profile into a reduced form using a regression equation; and train, an Artificial Neural Network (ANN) model using the preheat refractory temperature, the outer layer temperature, the reduced form of the preheat refractory temperature profile and the sample data to obtain a trained ANN model.

In yet another aspect, there is provided a computer program product comprising a non-transitory computer readable medium having a computer readable program embodied therein, wherein the computer readable program, when executed on a computing device, causes the computing device to: obtain, a plurality of training parameters comprising a set of geometrical parameters of a ladle furnace for processing a metal and a set of process parameters for associated ladle operations, wherein the ladle furnace is characterized by at least a side refractory and a bottom refractory; identify, a set of key training parameters using an influence index computed based on the plurality of training parameters; generate, sample data corresponding to the identified set of key training parameters by dividing the identified set of key training parameters into a plurality of sets, wherein each of the plurality of sets represents the set of geometrical parameters and the set of process parameters; generate, simulated data comprising a preheat refractory temperature, an outer layer temperature and a preheat refractory temperature profile before the ladle processing operation, for at least a portion of the side refractory and at least a portion of the bottom refractory, using a Computational Fluid Dynamics (CFD) model which receives the sample data as input; transform, the preheat refractory temperature profile into a reduced form using a regression equation; and train, an Artificial Neural Network (ANN) model using the preheat refractory temperature, the outer layer temperature, the reduced form of the preheat refractory temperature profile and the sample data to obtain a trained ANN model.

In accordance with an embodiment of the present disclosure, the set of geometrical parameters includes a range of values pertaining to at least (i) ladle top and bottom diameters, (ii) ladle height, (iii) plug position, (iv) plug diameters, (v) number of refractory layers, (vi) thickness of each of the refractory layers, and (vii) physical properties of each of the refractory layers including density and thermal conductivity; and the set of process parameters for ladle operations includes a range of values pertaining to at least (i) tapping time, (ii) initial tapping temperatures, (iii) slag height or slag weight, (iv) refining duration, (v) holding duration, (vi) casting speed and (vii) turnaround time In accordance with an embodiment of the present disclosure, the one or more hardware processors are further configured to identify the set of key training parameters by: selecting iteratively, a training parameter from the plurality of training parameters as input to the CFD model, the training parameter having a maximum value and a minimum value obtained from the range of values, until each of the plurality of training parameters has been selected in an iteration; simulating output values by the CFD model, in each iteration, using the maximum value and the minimum value of the selected training parameter while values of remaining training parameters from the plurality of training parameters are maintained constant for a corresponding iteration, wherein the output values represent temperature of the metal at a top of the ladle furnace and a bottom of the ladle furnace respectively, corresponding to each of the maximum value and the minimum value of the selected training parameter; computing the influence index for the top of the ladle furnace and the bottom of the ladle furnace as a percentage variation between output values simulated for the maximum value and the minimum value of the selected training parameter respectively; and identifying the selected training parameter as a key training parameter in the set of key training parameters, if at least one of the influence index computed for the top of the ladle furnace and the bottom of the ladle furnace is greater than a predefined threshold or within a predefined range of threshold values, wherein the predefined threshold and the predefined range of threshold values are based on required accuracy of prediction of the preheat refractory temperature profile.

In accordance with an embodiment of the present disclosure, the one or more hardware processors are configured to generate the sample data based on a Design of Experiments (DOE) method.

In accordance with an embodiment of the present disclosure, the one or more hardware processors are further configured to predict a preheat refractory temperature profile for input parameters pertaining to the ladle furnace and the ladle operations of a plant using the trained ANN model, for at least the portion of the side refractory and at least the portion of the bottom refractory of the ladle furnace, wherein predicting the preheat refractory temperature profile comprises: outputting, the preheat refractory temperature and the outer layer temperature using the trained ANN model; and predicting the preheat refractory temperature profile, using the outputted preheat refractory temperature, the outputted outer layer temperature and the reduced form of the preheat refractory temperature profile, for at least the portion of the side refractory and at least the portion of the bottom refractory of the ladle furnace.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
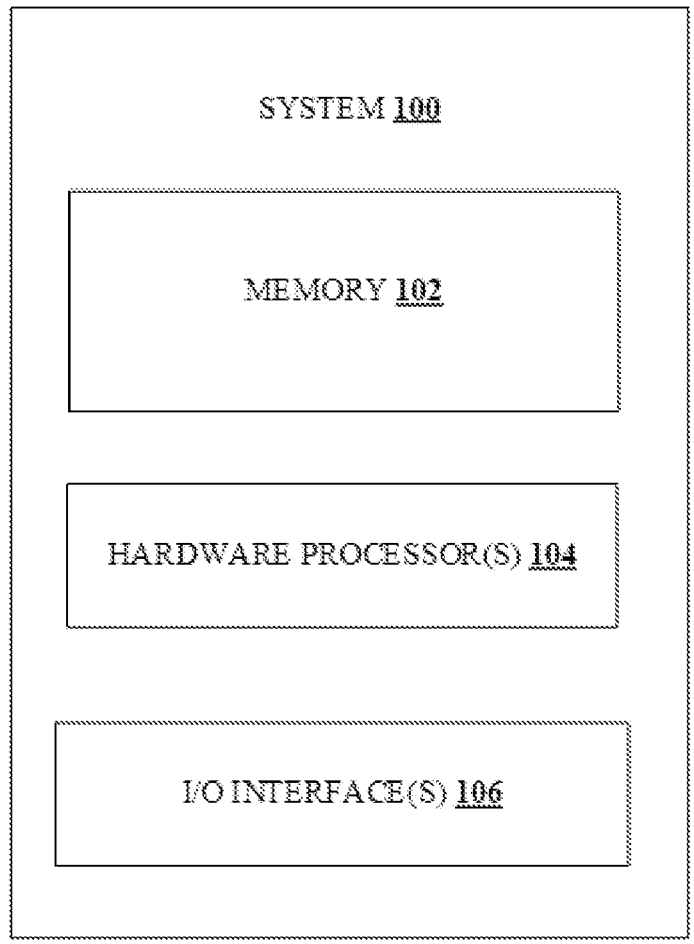
FIG. 1 illustrates an exemplary block diagram of a system for prediction of preheat refractory temperature profile of a ladle furnace, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Estimation of the losses from the refractory are key to maintenance of metal temperature in a tight range at a ladle furnace outlet by compensating for temperature losses with an appropriate arcing. Of all the losses, refractory temperature loss estimation, is the most challenging, considering it includes loss to the surrounding from the refractory walls and heat absorbed by the refractory itself that need to be considered. The heat absorbed by the refractory changes based on its prior temperature history or profile. Thus, knowing the initial or preheat refractory temperature profile is important for an overall estimation of the refractory temperature loss. In the context of the present disclosure, the expressions 'initial refractory temperature' and the 'preheat refractory temperature' may be used interchangeably and refers to a temperature profile of the face temperatures at different refractory points before the start of the ladle processing operation or at the end of a waiting period. Accordingly, the refractory temperature profile referred throughout the specification refers to the 'preheat refractory temperature'.

The present disclosure addresses the technical problem of prediction of the preheat refractory temperature profile of a ladle furnace. Since the operational temperature of the ladle furnace is very high, and stability of the sensors and placement at the different refractory points is very difficult, use of sensors to solve this technical problem is not feasible. There has been some exploration of the use of Computational Fluid Dynamics (CFD) simulations for different unit operations of the ladle furnace.

Unit operations or stages involved in ladle furnace operations include Tapping, Refining, Holding, Teeming followed by Waiting. During the Tapping process, liquid metal such as steel is poured into the ladle furnace from a Basic oxygen Furnace (BoF). The typical process takes about 5-10 minutes. Since the level of liquid metal changes with time, for performing CFD simulations, the simulation is performed for each period of 0.5 minutes of filling considering a constant liquid height for that time period. In the next time period of 0.5 minutes, the liquid level changes based on the filling rate, and the results of the previous simulation are used as input for the CFD simulation.

During the Refining process, since different types of operations are performed like addition of alloying elements and arcing for increasing the temperature, based on an alloy chill factor, heat gain and losses are calculated. Similarly, arcing heat gain is calculated based on electric arc intensity. The formulae for calculating the heat gain/loss due to addition of alloying elements and heat gain by arcing are as provided below.

Heat Gain/Loss Due to Addition:

$$q_{add} = \Sigma_i W_{add}^i Q_{add}^i \quad \rightarrow (1)$$

where $q_{add}$ is the heat loss/gain by addition of alloying elements, $W_{add}^i$ is weight of addition, $Q_{add}^i$ is a chill factor for a particular alloy element i.

Heat Gain by Arcing:

$$q_{arc} = \sqrt{3} \cdot V \cdot I \cdot \cos \phi \cdot \eta_{arc} \quad \rightarrow (2)$$

where V is the electric energy supply voltage, I is the current, cos ϕ is the power factor and $\eta_{arc}$ is the efficiency of electric energy to thermal energy conversion.

During the Holding process, CFD simulation with constant liquid metal height is performed.

During the Teeming process, liquid metal such as steel is taken out for the casting purpose. Therefore, the level of the liquid steel decreases with time. Accordingly, during the simulations, the liquid steel height changes with time are considered. The change is calculated based on the liquid steel outflow rate that in turn is dependent on a casting speed.

During the waiting period, since there is no liquid metal, only the refractory walls are considered for the CFD simulations.

CFD simulations require large computation time and cannot be used for a runtime application in plants. The method and system of the present disclosure uses CFD modeling to carry out parametric study to generate data which is further processed to train an Artificial Neural Network (ANN) model that serves as a prediction model and is used to get output variables like refractory preheat temperature and outer layer temperature for a new set of input data. Utilizing the output variables and an earlier fitted refractory profile equation obtained after processing of the CFD simulated data, the preheat refractory temperature profile is predicted for at least a portion of the side refractory and at least a portion of the bottom refractory layer separately for which the new set of input data is obtained.

Figure 2A:
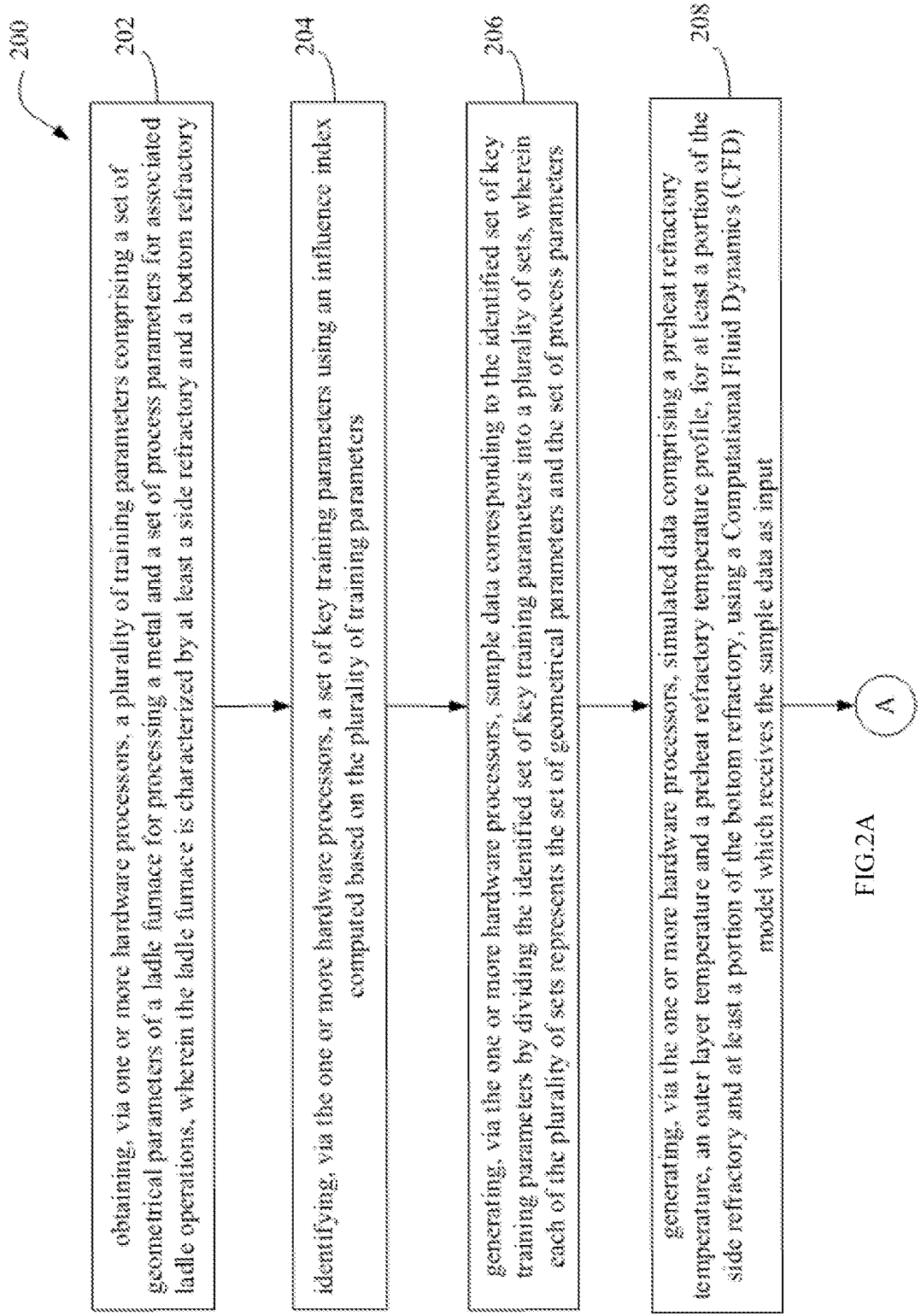
FIG. 2A through FIG. 2B illustrates an exemplary flow diagram of a computer implemented method for prediction of preheat refractory temperature profile of a ladle furnace, in accordance with some embodiments of the present disclosure.
Figure 2B:
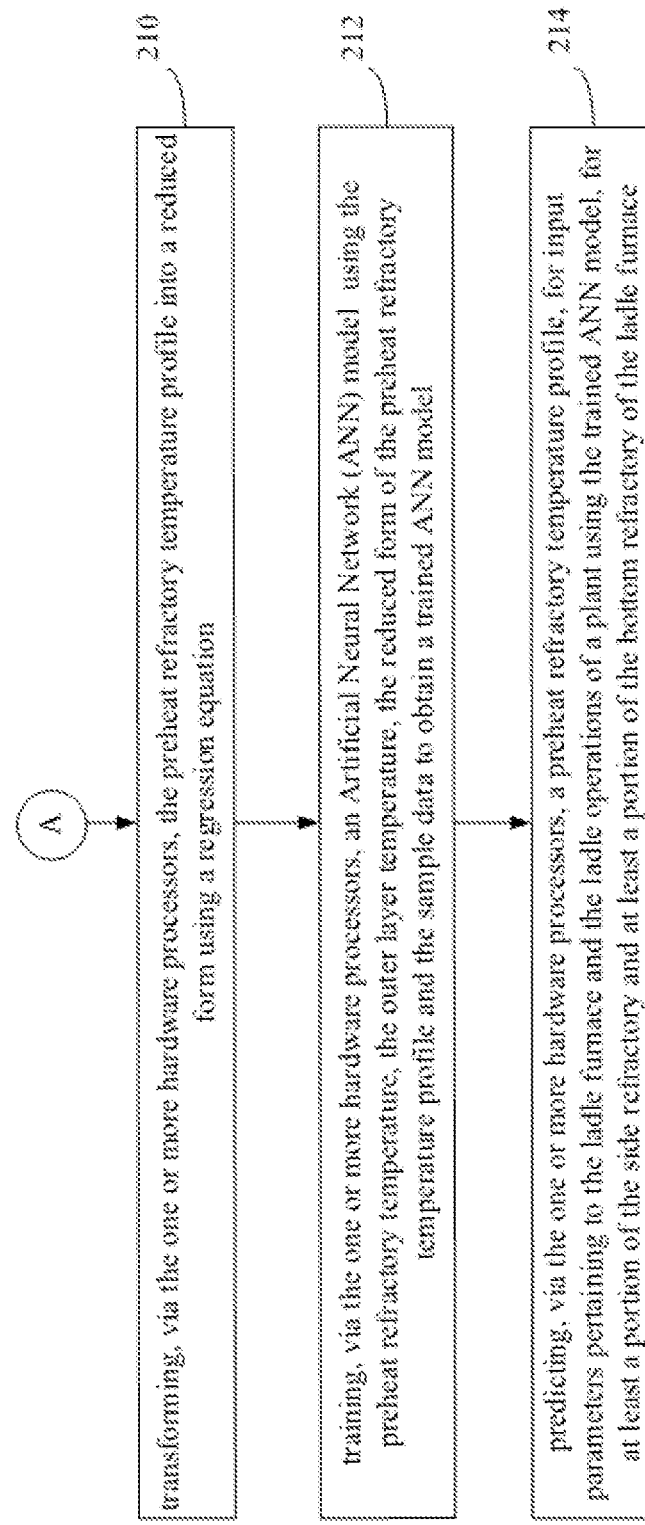
Figure 3:
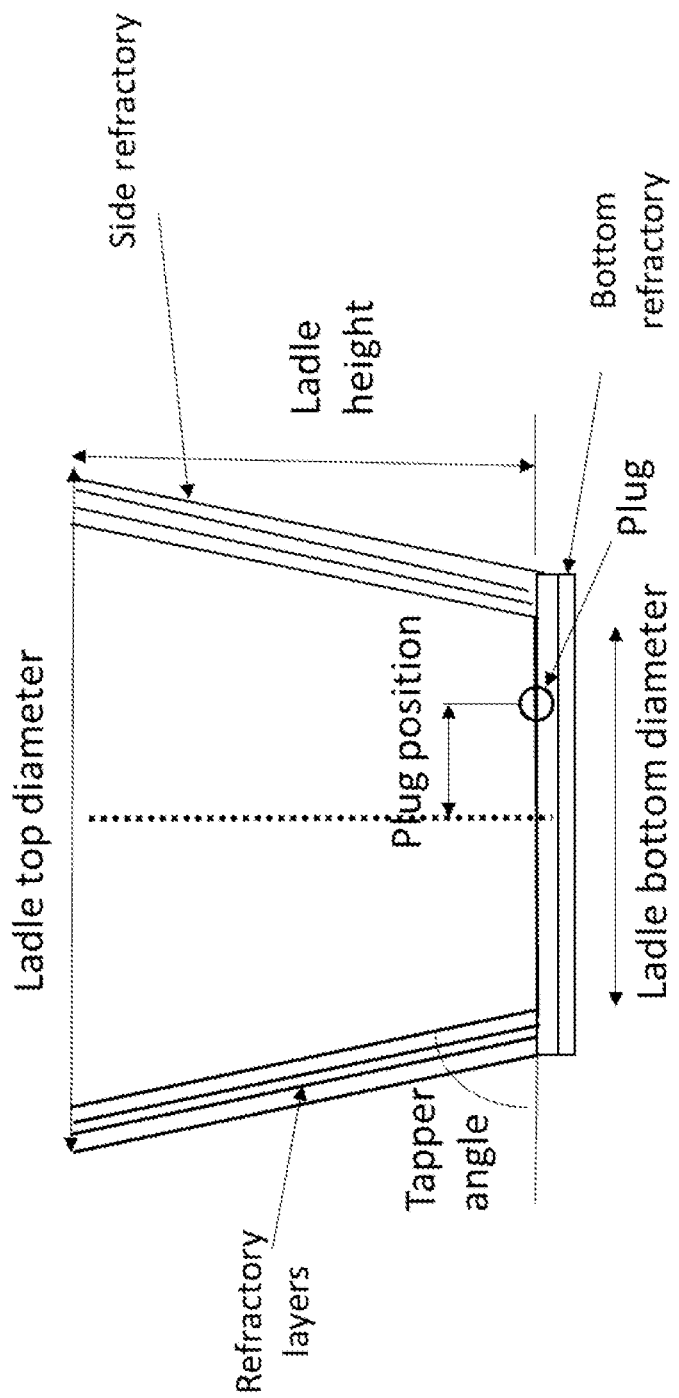
FIG. 3 illustrates an exemplary ladle furnace geometry, as known in the art.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates an exemplary block diagram of a system 100 for prediction of preheat refractory temperature profile of a ladle furnace, in accordance with some embodiments of the present disclosure. In an embodiment, the system 100 includes one or more hardware processors 104, communication interface device(s) or input/output (I/O) interface(s) 106, and one or more data storage devices or memory 102 operatively coupled to the one or more hardware processors 104. The one or more hardware processors 104 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

FIG. 2A through FIG. 2B illustrate an exemplary flow diagram of a computer implemented method 200 for prediction of preheat refractory temperature profile of a ladle furnace, in accordance with some embodiments of the present disclosure. FIG. 3 illustrates an exemplary ladle furnace geometry, as known in the art. In an embodiment, the system 100 includes one or more data storage devices or memory 102 operatively coupled to the one or more hardware processors 104 and is configured to store instructions configured for execution of steps of the method 200 by the one or more hardware processors 104. The steps of the method 200 will now be explained in detail with reference to the components of the system 100 of FIG. 1 and the exemplary ladle furnace geometry of FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Accordingly, in an embodiment of the present disclosure, the one or more hardware processors 104, are configured to obtain, at step 202, a plurality of training parameters comprising a set of geometrical parameters of a ladle furnace for processing a metal and a set of process parameters for associated ladle operations, wherein the ladle furnace is characterized by at least a side refractory and a bottom refractory as shown in FIG. 3.

The training parameters are typically specific to a plant utilizing the ladle furnace. In an embodiment, the set of geometrical parameters includes a range of values pertaining to at least (i) ladle top and bottom diameters, (ii) ladle height, (iii) plug position, (iv) plug diameters, (v) number of refractory layers, (vi) thickness of each of the refractory layers, and (vii) physical properties of each of the refractory layers including density and thermal conductivity; and the set of process parameters for ladle operations includes a range of values pertaining to at least (i) tapping time, (ii) initial tapping temperatures, (iii) slag height or slag weight, (iv) refining duration, (v) holding duration, (vi) casting speed and (vii) turnaround time. The training parameters may be assumed based on domain expertise in the absence of information on the range of values. Alternatively, there may be additional parameters included as part of the plurality of training parameters.

Table 1 and Table 2 below provide an exemplary range of values for the plurality of training parameters. Only some of the training parameters are shown for ease of explanation. Some additional parameters are also shown for reference.

Once the plurality of training parameters is obtained, a set of key training parameters is identified from the obtained plurality of training parameters. Accordingly, in an embodiment of the present disclosure, the one or more hardware processors 104, are configured to identify, at step 204, the set of key training parameters using an influence index computed based on the plurality of training parameters. In an embodiment, the step of identifying the set of key training parameters is an iterative process. In each iteration, one of the training parameters from the plurality of training parameters is selected as an input to a CFD model until each of the plurality of training parameters has been selected in an iteration. Each of the training parameters has a maximum value and a minimum value obtained from the range of values as shown in Table 1 and Table 2 above.

In accordance with the present disclosure, the CFD model simulates output values, in each iteration, using the maximum value and the minimum value of the selected training parameter while values of remaining training parameters from the plurality of training parameters are maintained constant for a corresponding iteration, wherein the output values represent temperature of the metal at a top of the ladle furnace and a bottom of the ladle furnace respectively, corresponding to each of the maximum value and the minimum value of the selected training parameter. In an embodiment, the metal may be steel.

Table 3 and Table 4 below provide an exemplary training parameter selected along with the remaining parameters from the exemplary parameters of Table 1 and Table 2 above.

TABLE 1

Exemplary range of values for some geometrical parameters.

| Training parameters | Geometrical parameters | | | | | | |
| --- | --- | --- | --- | --- | --- | --- | --- |
| | Ladle height (m) | Ladle top Dia (m) | Ladle bottom Dia | Plug position | Plug Dia (m) | Number of refractory | Refractory layer |
| Mini. value | 3.5 | 3 | 3.2 | 0.5 | 0.05 | 4 | 0.3 |
| Max. value | 4.5 | 4 | 4.2 | 2 | 0.1 | 5 | 0.5 |

TABLE 2

Exemplary range of values for some process parameters.

| Training parameters | Process parameters | | | | | | | | | |
| --- | --- | --- | --- | --- | --- | --- | --- | --- | --- | --- |
| | Tapping time | Holding time | Turn-around time | Teeming time | Arcing duration | Refining duration | Initial tapping metal | Casting speed | Slag height (m) | Arcing intensity | weight of addition (Kg) |
| Mini. value | 5 | 20 | 60 | 40 | 4 | 10 | 1600 | 0.75 | 0.05 | 6 | 50 |
| Max. value | 10 | 60 | 180 | 80 | 15 | 50 | 1670 | 2.5 | 0.2 | 15 | 400 |

TABLE 3

Exemplary Selected training parameter for an iteration: ladle height with other geometrical parameters being maintained constant.

| | Ladle height (m) | Ladle Diameter | Ladle bottom | Plug position | Plug diameter | Number of refractory | Refractory thickness (Kg) |
|---|---|---|---|---|---|---|---|
| Case 1 | 3.5 | 3 | 3.2 | 0.5 | 0.05 | 4 | 0.3 |
| Case 2 | 4.5 | 3 | 3.2 | 0.5 | 0.05 | 4 | 0.3 |

It may be noted that Case 1 and Case 2 present two extreme values (maximum and minimum) of the selected training parameter (Ladle height) while the values of the remaining parameters are maintained constant at an associated minimum value. Alternatively, the remaining parameters may be maintained constant at an associated constant value or an intermediate value in the range of values obtained.

TABLE 4

Exemplary Selected training parameter for an iteration: ladle height with the process parameters being maintained constant.

| | Tapping time (min) | Holding time (min) | Turn-around time | Teeming time (min) | Arcing duration (min) | Refining duration | Initial tapping metal | Casting speed | Slag height (m) | Arcing intensity (mw) | Weight of addition (Kg) | Top temperature | Bottom temperature |
|---|---|---|---|---|---|---|---|---|---|---|---|---|---|
| Case 1 | 5 | 20 | 60 | 40 | 4 | 10 | 1600 | 0.75 | 0.05 | 6 | 50 | 960 | 1000 |
| Case 2 | 5 | 20 | 60 | 40 | 4 | 10 | 1600 | 0.75 | 0.05 | 6 | 50 | 800 | 900 |
| | | | | | | | | | | | Influence Index | 16.7% | 10.0% |

The simulated output values in an example iteration using values shown in Table 3 and Table 4 are 960° C. and 1000° C. as the temperature at a top of the ladle furnace and a bottom of the ladle furnace respectively for Case 1 and 800° C. and 900° C. respectively for Case 2. In accordance with the present disclosure, the influence index is computed as a percentage variation between the output values simulated for Case 1 and Case 2. Accordingly, the influence index for the top of the ladle furnace is 16.7% and for the bottom of the ladle furnace is 10.0%.

In accordance with the present disclosure, the selected training parameter is identified as a key training parameter in the set of key training parameters, if at least one of the influence index computed for the top of the ladle furnace and the bottom of the ladle furnace is greater than a predefined threshold or within a predefined range of threshold values. For instance, the predefined threshold may be 11% or a range 10% to 15% for say, steel. The predefined threshold and the predefined range of threshold values are based on required accuracy of prediction of preheat refractory temperature profile. More the accuracy needed, lower is the predefined threshold or the predefined range of threshold values. In the example of Table 3 and Table 4 above, if the predefined threshold is 11%, since at least the influence index of the top of the ladle furnace (16.7%) is greater than 11%, the training parameter, ladle height is identified as a key training parameter in the set of key training parameters.

In an embodiment of the present disclosure, the one or more hardware processors 104, are configured to generate, at step 206, sample data corresponding to the identified set of key training parameters at step 204. In an embodiment, the sample data is generated by dividing the identified set of key training parameters into a plurality of sets, wherein each of the plurality of sets represents the set of geometrical parameters and the set of process parameters. In an embodiment, dividing of the identified set of key training parameters may be based on a Design of Experiments (DoE) method such as a full factorial method, Taguchi method, and the like.

In an embodiment, the Taguchi method used is described hereinafter: The Taguchi DoE uses a special set of arrays called orthogonal arrays. The method is typically used for minimal number of experiments which gives full information of all factors that affect a performance parameter. In this orthogonal array method, number of levels combinations of input design variables for each experiment are set and the array is generated for doing the experiments. For example, to conduct an experiment for understanding the influence of 4 different independent variables with each variable having 3 level values, an L9 orthogonal array is best used. An example of a Taguchi table using L9 orthogonal array is given below.

TABLE 5

Taguchi Table (L9 orthogonal array)

| Experiment number | Independent variable 1 | Independent variable 2 | Independent variable 3 | Independent variable 4 |
|---|---|---|---|---|
| 1 | 1 | 1 | 1 | 1 |
| 2 | 1 | 2 | 2 | 2 |
| 3 | 1 | 3 | 3 | 3 |
| 4 | 2 | 1 | 2 | 3 |
| 5 | 2 | 2 | 3 | 1 |
| 6 | 2 | 3 | 1 | 2 |
| 7 | 3 | 1 | 3 | 2 |
| 8 | 3 | 2 | 1 | 3 |
| 9 | 3 | 3 | 2 | 1 |

Level values can be defined based on a minimum and maximum value and one middle value. Say, for an independent variable, temperature, that can have a value between 1580° C. to 1630° C., the values for three levels may be 1580 (referred by '1' in the Taguchi Table), 1600 (referred by '2' in the Taguchi Table), and 1630 (referred by '3' in the Taguchi Table). The middle value may be taken based on domain knowledge. Similarly, all the independent variable levels are selected, and the Taguchi table is created.

In an embodiment of the present disclosure, the one or more hardware processors 104, are configured to generate, at step 208, simulated data comprising a preheat refractory temperature, an outer layer temperature and a refractory temperature profile before the ladle processing operation, for at least a portion of the side refractory and at least a portion of the bottom refractory, using the CFD model which receives the sample data as input. The simulated refractory temperature profile before the ladle processing operation (also referred as the end of the waiting period is based on temperatures at various points across the refractory thickness. The generating of simulated data uses the plurality of sets of the key training parameters and converts them into ladle mesh and boundary conditions. In accordance with an embodiment of the present disclosure, the CFD model for conjugate heat transfer is used to carry out the simulation for capturing physical phenomena including heat transfer, fluid flow and turbulence present in ladle processing operations. The CFD model uses a mesh file generated after creating a virtual geometry of the ladle furnace using the geometrical parameters of the ladle furnace obtained at step 202. The obtained process parameters are used to generate boundary conditions needed in the CFD modeling. Some solver conditions are also used in the CFD model for getting converged solutions. The simulations are then carried out to get a converged numerical solution. Output variables including a preheat refractory temperature, an outer layer temperature and a refractory temperature profile corresponding to the input are extracted from the CFD simulation results for two sets of refractories in the ladle furnace—at least the portion of the side refractory and at least the portion of the bottom refractory.

In an embodiment of the present disclosure, the one or more hardware processors 104, are configured to transform, at step 210, the refractory temperature profile into a reduced form using a regression equation. Accordingly, the temperatures T at various points in the refractory temperature profile gets transformed into a few regression coefficients representing the reduced order CFD model parameters. For instance, say the refractory temperature profile Y is represented as a polynomial equation $$Y = a + bT + cT^2 + dT^3 \quad \rightarrow (3)$$

where a, b, c, and d represent regression coefficients in the reduced form. In accordance with the present disclosure, two such equations are obtained, one each for at least the portion of the side refractory and at least the portion of the bottom refractory under consideration.

In an embodiment of the present disclosure, the one or more hardware processors 104, are configured to train, at step 212, an ANN model. During the one-time training activity for a given plant, the sample data is used as the input and the preheat refractory temperature, the outer layer temperature, and the reduced form of the refractory temperature profile as the output to obtain a trained ANN model.

As part of the training activity, a part of the input and the output described above may be used as training data and a part may be used for validating the ANN model. In this case, predicted results from the trained ANN model are compared with actual CFD results. When all predicted results lie within a predetermined limit, say ±5%, then the ANN model may be considered as a trained model. In an embodiment, training of the ANN model starts with two hidden layers, one input layer and one output layer. Backpropagation algorithm is used while training the network and the number of hidden layers is varied. Each hidden layer starts with minimum three nodes and sequentially increases/decreases based on the validation results. When the predicted results are validated, i.e. the predicted results lay within say ±5% of the actual CFD results, then the network architecture is stored. Different network architectures may be stored for different number of hidden layers and then compared for further validation amongst them. The network which provides the highest accuracy is selected as the trained ANN model.

The training of the ANN model is further explained in accordance with an embodiment of the present disclosure as given hereinafter. A multi-layer perceptron (MLP) network is used in the modeling. The network has 5, 5 and 1 number of neurons (node) in the input layer, hidden layer and output layer respectively. Each neuron has an associated weight and biases. Back-propagation (BP) learning algorithm is used for training the network.

Preprocessing the inputs: All the inputs and outputs are normalized individually.

Back Propagation Training Algorithm:
  Step 1: Initialize the weights and biases in the network.
  Step 2. Propagate inputs forward
    All outputs are computed using a sigmoid threshold of an inner product of the corresponding weight and input vectors.
    All outputs at stage n are connected to all the inputs at stage n+1.
  Step 3. Error back-propagation
    Propagate the errors backwards by apportioning it to each node according to associated influence level (based on weights and biases)
  Step 4. Training termination
    Maximum number of iterations is reached.
    Specified target error value is reached.

Initialization of the network: The first step of a neural network modeling is the initialization of the network. All the weights and biases associated with the nodes are given some initial value for the start of the iteration. These weights and biases are then modified as the training progresses. All the weights and biases of the network are initialized with random values.

Forward propagation of inputs: The second step of the neural network modeling starts with passing the training data to the input layer of the network. The training data passing through the input layer is unchanged. A net input and output of each node in the hidden and output layers are computed. The net input to a node in the hidden or output layers is computed as a linear combination of its inputs. Net output of the node is computed by multiplying the inputs connected to the node with its corresponding weight, and then is summed up with the biases. Given a node I in a hidden layer or output layer, the net input $I_j$ to a node j may be represented as given below.

$$I_j = \Sigma_i W_{ij} O_i \theta_j \quad \rightarrow (4)$$

where $W_{ij}$ is the weight of a connection from the node $I_j$ in a previous layer to the node j. $O_i$ is the output of the node I from the previous layer and $\theta_j$ is the bias of the node. The bias acts as a threshold in that it serves to vary the activity of the node. Each node in the hidden and output layers takes its net input and then applies an activation function. The function symbolizes the activation of the node. A logistic or sigmoid function is used and the output of the node j, is computed as given below.

$$O_j = \frac{1}{1 + e^{-I}} \quad (5)$$

wherein this function is also referred to as squashing function, because it maps a large input domain onto the smaller range of 0 to 1.

Back propagation of error: The error is back propagated by updating the weights and biases to reflect the networks prediction. For a node j in the output layer, the error is computed based on the equation given below.

$$Err_j = O_j(1-O_j)(T_j-O_j) \quad \rightarrow (6)$$

where $O_j$ is the actual output of the node j and $T_j$ is a known target value of the given training data.

To compute the error of a hidden layer node j, a weighted sum of the errors of the nodes connected to the node j in the next layer is considered. The error of a hidden layer node j is calculated based on the equation given below.

$$Err_j = O_j(1-O_j)\Sigma_k Err_k w_{jk} \quad \rightarrow (7)$$

where $w_{jk}$ is the weight of the connection from the node j to a node k in a next higher layer, and $Err_k$ is the error of the node k.

The weights and biases are updated to reflect the propagated errors. The weights are updated according to the weights calculated based on the equation given below.

$$W_{ij} = W_{ij} + (l)Err_j O_i \quad \rightarrow (8)$$

where l is the learning rate, a constant having a value between 0 to 1. Back propagation learns using a method of gradient descent to search for a set of weights that fits the training data to minimize the mean squared error.

The learning rate helps avoid being stuck at a local minimum and encourages finding global minimum. Biases are updated based on the equation given below.

$$\theta_j = \theta_j + (l)Err_j \quad \rightarrow (9)$$

Convergence criteria (termination of training/obtaining the trained ANN model): Following terminating conditions were applied during training the network.

All weights in the previous epoch were so small as to be below some specific threshold.

A pre-specified number of epochs have expired.

In accordance with the present disclosure, the trained ANN model then serves as a prediction model and is used to get output variables like refractory preheat temperature and outer layer temperature for a new set of input data. Further, utilizing the output variables and the earlier fitted refractory profile equation or the reduced form of the refractory temperature profile, the preheat refractory temperature profile is predicted for the portion of the side refractory and the portion of the bottom refractory layer separately for which the new set of input data was obtained. Accordingly, in an embodiment of the present disclosure, the one or more hardware processors 104, are configured to predict, at step 214, a preheat refractory temperature profile for input parameters pertaining to the ladle furnace and the ladle operations of a plant using the trained ANN model, for at least the portion of the side refractory and at least the portion of the bottom refractory of the ladle furnace. In an embodiment, the preheat refractory temperature and the outer layer temperature are outputted using the trained ANN model and the preheat refractory temperature profile is predicted using the outputted preheat refractory temperature, the outputted outer layer temperature and the reduced form of the refractory temperature profile, for at least the portion of the side refractory and at least the portion of the bottom refractory of the ladle furnace under consideration.

The method and system of the present disclosure thus overcome the challenges of the art including (i) using sensors in a high operating temperature zone ladle furnace and (ii) generating refractory profile using resource intensive CFD simulations in a runtime environment for predicting the preheat refractory temperature profile of the ladle furnace by utilizing the strength of mathematically modeling required to get accuracy of industrial processes and quickness that can be applied during runtime of the plant. Data required to train the ANN model is generated using the CFD simulations which is then further processed (reduced order CFD model parameters) to predict the preheat refractory temperature profile thereby eliminating the challenges of predicting either using measurements or simulations as known in the art. The technical problem of the present disclosure involves complex turbulent fluid flow environment and hence obtaining a suitable CFD model and then identification of suitable variables and its linkage with the model for faster prediction of the preheat refractory temperature profile in a runtime environment is the technical advance provided in the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more hardware processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising the steps of:
   obtaining, via one or more hardware processors, a plurality of training parameters comprising a set of geometrical parameters of a ladle furnace for processing a metal and a set of process parameters for associated ladle operations, wherein the ladle furnace is characterized by at least a side refractory and a bottom refractory;
   identifying, via the one or more hardware processors, a set of key training parameters using an influence index computed based on the plurality of training parameters;
   generating, via the one or more hardware processors, sample data corresponding to the identified set of key training parameters by dividing the identified set of key training parameters into a plurality of sets, wherein each of the plurality of sets represents the set of geometrical parameters and the set of process parameters;
   generating, via the one or more hardware processors, simulated data comprising a preheat refractory temperature, an outer layer temperature and a preheat refractory temperature profile, for at least a portion of the side refractory and at least a portion of the bottom refractory, using a Computational Fluid Dynamics (CFD) model which receives the sample data as input;
   transforming, via the one or more hardware processors, the preheat refractory temperature profile into a reduced form using a regression equation; and
   training, via the one or more hardware processors, an Artificial Neural Network (ANN) model using the preheat refractory temperature, the outer layer temperature, the reduced form of the preheat refractory temperature profile and the sample data to obtain a trained ANN model.

2. The processor implemented method of claim 1, wherein the set of geometrical parameters includes a range of values pertaining to at least (i) ladle top and bottom diameters, (ii) ladle height, (iii) plug position, (iv) plug diameters, (v) number of refractory layers, (vi) thickness of each of the refractory layers, and (vii) physical properties of each of the refractory layers including density and thermal conductivity; and the set of process parameters for ladle operations includes a range of values pertaining to at least (i) tapping time, (ii) initial tapping temperatures, (iii) slag height or slag weight, (iv) refining duration, (v) holding duration, (vi) casting speed and (vii) turnaround time.

3. The processor implemented method of claim 2, wherein the step of identifying a set of key training parameters comprises:
   selecting iteratively, a training parameter from the plurality of training parameters as input to the CFD model, the training parameter having a maximum value and a minimum value obtained from the range of values, until each of the plurality of training parameters has been selected in an iteration;
   simulating output values by the CFD model, in each iteration, using the maximum value and the minimum value of the selected training parameter while values of remaining training parameters from the plurality of training parameters are maintained constant for a corresponding iteration, wherein the output values represent temperature of the metal at a top of the ladle furnace and a bottom of the ladle furnace respectively, corresponding to each of the maximum value and the minimum value of the selected training parameter;
   computing the influence index for the top of the ladle furnace and the bottom of the ladle furnace as a percentage variation between output values simulated for the maximum value and the minimum value of the selected training parameter respectively; and
   identifying the selected training parameter as a key training parameter in the set of key training parameters, if at least one of the influence index computed for the top of the ladle furnace and the bottom of the ladle furnace is greater than a predefined threshold or within a predefined range of threshold values, wherein the predefined threshold and the predefined range of threshold values are based on required accuracy of prediction of the preheat refractory temperature profile.

4. The processor implemented method of claim 1, wherein the step of generating sample data is based on a Design of Experiments (DOE) method.

5. The processor implemented method of claim 1 further comprising: predicting, via the one or more hardware processors, a preheat refractory temperature profile for input parameters pertaining to the ladle furnace and the ladle operations of a plant using the trained ANN model, for at least the portion of the side refractory and at least the portion of the bottom refractory of the ladle furnace, wherein the step of predicting comprises:
   outputting, the preheat refractory temperature and the outer layer temperature using the trained ANN model; and
   predicting the preheat refractory temperature profile, using the outputted preheat refractory temperature, the outputted outer layer temperature and the reduced form of the preheat refractory temperature profile, for at least the portion of the side refractory and at least the portion of the bottom refractory of the ladle furnace.

6. A system comprising:

one or more data storage devices operatively coupled to one or more hardware processors and configured to store instructions for execution via the one or more hardware processors to:

obtain, a plurality of training parameters comprising a set of geometrical parameters of a ladle furnace for processing a metal and a set of process parameters for associated ladle operations, wherein the ladle furnace is characterized by at least a side refractory and a bottom refractory;

identify, a set of key training parameters using an influence index computed based on the plurality of training parameters;

generate, sample data corresponding to the identified set of key training parameters by dividing the identified set of key training parameters into a plurality of sets, wherein each of the plurality of sets represents the set of geometrical parameters and the set of process parameters;

generate, simulated data comprising a preheat refractory temperature, an outer layer temperature and a preheat refractory temperature profile, for at least a portion of the side refractory and at least a portion of the bottom refractory, using a Computational Fluid Dynamics (CFD) model which receives the sample data as input;

transform, the preheat refractory temperature profile into a reduced form using a regression equation; and train, an Artificial Neural Network (ANN) model using the preheat refractory temperature, the outer layer temperature, the reduced form of the preheat refractory temperature profile and the sample data to obtain a trained ANN model.

7. The system of claim 6, wherein the set of geometrical parameters includes a range of values pertaining to at least (i) ladle top and bottom diameters, (ii) ladle height, (iii) plug position, (iv) plug diameters, (v) number of refractory layers, (vi) thickness of each of the refractory layers, and (vii) physical properties of each of the refractory layers including density and thermal conductivity; and the set of process parameters for ladle operations includes a range of values pertaining to at least (i) tapping time, (ii) initial tapping temperatures, (iii) slag height or slag weight, (iv) refining duration, (v) holding duration, (vi) casting speed and (vii) turnaround time.

8. The system of claim 7, wherein the one or more hardware processors are configured by the instructions to identify the set of key training parameters by:

selecting iteratively, a training parameter from the plurality of training parameters as input to the CFD model, the training parameter having a maximum value and a minimum value obtained from the range of values, until each of the plurality of training parameters has been selected in an iteration;

simulating output values by the CFD model, in each iteration, using the maximum value and the minimum value of the selected training parameter while values of remaining training parameters from the plurality of training parameters are maintained constant for a corresponding iteration, wherein the output values represent temperature of the metal at a top of the ladle furnace and a bottom of the ladle furnace respectively, corresponding to each of the maximum value and the minimum value of the selected training parameter;

computing the influence index for the top of the ladle furnace and the bottom of the ladle furnace as a percentage variation between output values simulated for the maximum value and the minimum value of the selected training parameter respectively; and identifying the selected training parameter as a key training parameter in the set of key training parameters, if at least one of the influence index computed for the top of the ladle furnace and the bottom of the ladle furnace is greater than a predefined threshold or within a predefined range of threshold values, wherein the predefined threshold and the predefined range of threshold values are based on required accuracy of prediction of the preheat refractory temperature profile.

9. The system of claim 6, wherein the one or more hardware processors are configured by the instructions to generate the sample data based on a Design of Experiments (DOE) method.

10. The system of claim 6, wherein the one or more hardware processors are further configured by the instructions to: predict a preheat refractory temperature profile for input parameters pertaining to the ladle furnace and the ladle operations of a plant using the trained ANN model, for at least the portion of the side refractory and at least the portion of the bottom refractory of the ladle furnace, wherein predicting the preheat refractory temperature profile comprises:

outputting, the preheat refractory temperature and the outer layer temperature using the trained ANN model; and predicting the preheat refractory temperature profile, using the outputted preheat refractory temperature, the outputted outer layer temperature and the reduced form of the preheat refractory temperature profile, for at least the portion of the side refractory and at least the portion of the bottom refractory of the ladle furnace.

11. One or more non-transitory machine-readable information storage mediums comprising one or more instructions which when executed by one or more hardware processors cause:

obtaining, via the one or more hardware processors, a plurality of training parameters comprising a set of geometrical parameters of a ladle furnace for processing a metal and a set of process parameters for associated ladle operations, wherein the ladle furnace is characterized by at least a side refractory and a bottom refractory;

identifying, via the one or more hardware processors, a set of key training parameters using an influence index computed based on the plurality of training parameters;

generating, via the one or more hardware processors, sample data corresponding to the identified set of key training parameters by dividing the identified set of key training parameters into a plurality of sets, wherein each of the plurality of sets represents the set of geometrical parameters and the set of process parameters;

generating, via the one or more hardware processors, simulated data comprising a preheat refractory temperature, an outer layer temperature and a preheat refractory temperature profile, for at least a portion of the side refractory and at least a portion of the bottom refractory, using a Computational Fluid Dynamics (CFD) model which receives the sample data as input;

transforming, via the one or more hardware processors, the preheat refractory temperature profile into a reduced form using a regression equation; and training, via the one or more hardware processors, an Artificial Neural Network (ANN) model using the preheat refractory temperature, the outer layer temperature, the reduced form of the preheat refractory temperature profile and the sample data to obtain a trained ANN model.

12. The one or more non-transitory machine-readable information storage mediums of claim 11, wherein the set of geometrical parameters includes a range of values pertaining to at least (i) ladle top and bottom diameters, (ii) ladle height, (iii) plug position, (iv) plug diameters, (v) number of refractory layers, (vi) thickness of each of the refractory layers, and (vii) physical properties of each of the refractory layers including density and thermal conductivity; and the set of process parameters for ladle operations includes a range of values pertaining to at least (i) tapping time, (ii) initial tapping temperatures, (iii) slag height or slag weight, (iv) refining duration, (v) holding duration, (vi) casting speed and (vii) turnaround time.

13. The one or more non-transitory machine-readable information storage mediums of claim 12, wherein the one or more instructions further cause identifying a set of key training parameters by:

selecting iteratively, a training parameter from the plurality of training parameters as input to the CFD model, the training parameter having a maximum value and a minimum value obtained from the range of values, until each of the plurality of training parameters has been selected in an iteration;

simulating output values by the CFD model, in each iteration, using the maximum value and the minimum value of the selected training parameter while values of remaining training parameters from the plurality of training parameters are maintained constant for a corresponding iteration, wherein the output values represent temperature of the metal at a top of the ladle furnace and a bottom of the ladle furnace respectively, corresponding to each of the maximum value and the minimum value of the selected training parameter;

computing the influence index for the top of the ladle furnace and the bottom of the ladle furnace as a percentage variation between output values simulated for the maximum value and the minimum value of the selected training parameter respectively; and identifying the selected training parameter as a key training parameter in the set of key training parameters, if at least one of the influence index computed for the top of the ladle furnace and the bottom of the ladle furnace is greater than a predefined threshold or within a predefined range of threshold values, wherein the predefined threshold and the predefined range of threshold values are based on required accuracy of prediction of the preheat refractory temperature profile.

14. The one or more non-transitory machine-readable information storage mediums of claim 11, wherein the one or more instructions further cause generating sample data based on a Design of Experiments (DOE) method.

15. The one or more non-transitory machine-readable information storage mediums of claim 11, wherein the one or more instructions further cause predicting, via the one or more hardware processors, a preheat refractory temperature profile for input parameters pertaining to the ladle furnace and the ladle operations of a plant using the trained ANN model, for at least the portion of the side refractory and at least the portion of the bottom refractory of the ladle furnace, wherein the step of predicting comprises:

outputting, the preheat refractory temperature and the outer layer temperature using the trained ANN model; and predicting the preheat refractory temperature profile, using the outputted preheat refractory temperature, the outputted outer layer temperature and the reduced form of the preheat refractory temperature profile, for at least the portion of the side refractory and at least the portion of the bottom refractory of the ladle furnace.

* * * * *